United States Patent
Ueda et al.

(10) Patent No.: US 9,500,547 B1
(45) Date of Patent: Nov. 22, 2016

(54) SHOCK RECORDING DEVICE

(71) Applicant: PANASONIC INTELLECTUAL PROPERTY MANAGEMENT CO., LTD., Osaka (JP)

(72) Inventors: Michihito Ueda, Kyoto (JP); Yukihiro Kaneko, Osaka (JP); Yu Nishitani, Kyoto (JP); Atsushi Omote, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/229,778

(22) Filed: Aug. 5, 2016

Related U.S. Application Data

(62) Division of application No. 14/623,076, filed on Feb. 16, 2015, now Pat. No. 9,435,704.

(30) Foreign Application Priority Data

Feb. 25, 2014 (JP) .................. 2014-033909

(51) Int. Cl.
  *G01L 1/18* (2006.01)
  *G01L 1/22* (2006.01)
  *G01L 5/00* (2006.01)

(52) U.S. Cl.
  CPC ............. *G01L 5/0052* (2013.01); *G01L 1/18* (2013.01); *G01L 1/2293* (2013.01)

(58) Field of Classification Search
  CPC ... G01D 15/06; G01L 5/0052; G01L 1/2293; G01L 1/18; G01P 1/127; G01P 15/036
  See application file for complete search history.

(56) References Cited

U.S. PATENT DOCUMENTS 6,864,790 B2   3/2005   Nishihara et al.

FOREIGN PATENT DOCUMENTS

| JP | 2002-243754 A | 8/2002 | |
| JP | 2004-061347 A | 2/2004 | |
| JP | 2013-096931 A | 5/2013 | |
| WO | 2013/065493 A1 | 5/2013 | |
| WO | WO 2013/065493 A1 * | 5/2013 | ............. G01P 15/09 |

OTHER PUBLICATIONS

Non-Final Office Action issued in U.S. Appl. No. 14/623,076, mailed on Mar. 18, 2016.

* cited by examiner

*Primary Examiner* — Geoffrey Mruk
(74) *Attorney, Agent, or Firm* — McDermott Will & Emery LLP

(57) ABSTRACT

The present invention provides a shock recording device, comprising: a vibration energy harvester comprising a first electrode and a second electrode, the vibration energy harvester converting an energy of a shock applied thereto into a potential difference between the first electrode and the second electrode; and a ferroelectric transistor comprising a gate electrode, a source electrode, and a drain electrode, the ferroelectric transistor further comprising a stacked structure of a ferroelectric layer and a semiconductor layer. The gate electrode is electrically connected to the first electrode. The source electrode is electrically connected to the second electrode. This shock recording device does not need a power source used to record a shock.

6 Claims, 13 Drawing Sheets

SHOCK RECORDING DEVICE

This application is a Divisional application of U.S. patent application Ser. No. 14/623,076, filed on Feb. 16, 2015, which in turn claims the benefit of Japanese Application No. 2014-033909, filed on Feb. 25, 2014, the disclosures of which applications are incorporated by reference herein.

BACKGROUND

1. Technical Field

The present invention relates to a shock recording device for recording an external shock.

2. Description of the Related Art

U.S. Pat. No. 6,864,790 discloses an electronic apparatus and a method of detecting a shock given to the electronic apparatus. Japanese Patent Publication No. 5545417B discloses an impact detecting/recording device. Japanese Patent Application laid-open Publication No. 2004-061347A discloses a piezoelectric vibration energy sensor. Japanese Patent Application laid-open Publication No. 2013-096931A discloses an impact detecting/recording device.

SUMMARY

The present invention provides a shock recording device, comprising:

a vibration energy harvester comprising a first electrode and a second electrode, the vibration energy harvester converting an energy of a shock applied thereto into a potential difference between the first electrode and the second electrode; and a ferroelectric transistor comprising a gate electrode, a source electrode, and a drain electrode, the ferroelectric transistor further comprising a stacked structure of a ferroelectric layer and a semiconductor layer, wherein the gate electrode is electrically connected to the first electrode; and the source electrode is electrically connected to the second electrode.

The present invention provides a shock recording device which does not need a power source used to record a shock.

DETAILED DESCRIPTION OF THE EMBODIMENTS

Hereinafter, the embodiments of the present invention will be described with reference to the drawings.

First Embodiment

Figure 1:
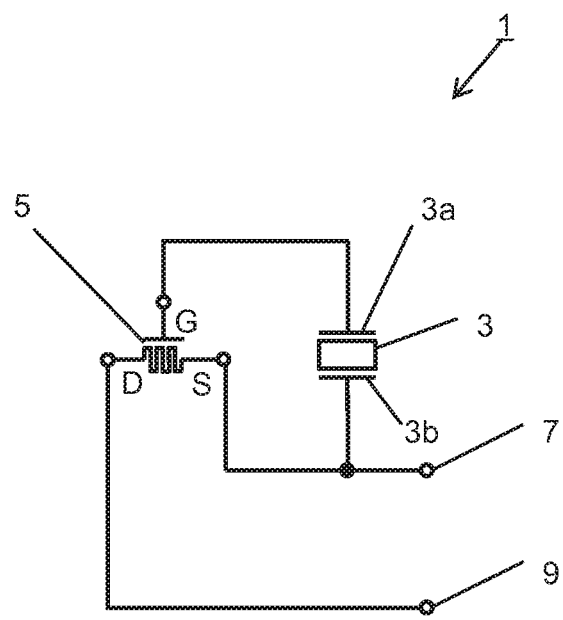
FIG. 1 shows a circuit diagram of a shock recording device according to a first embodiment.

FIG. 1 shows a circuit diagram of a shock recording device according to the first embodiment. As shown in FIG. 1, a shock recording device 1 according to the first embodiment includes a vibration energy harvester 3 and a nonvolatile memory 5. The vibration energy harvester 3 comprises a first electrode 3a and a second electrode 3b. An example of the nonvolatile memory 5 is a ferroelectric transistor having a source electrode S, a drain electrode D, and a gate electrode G. As will be described later, the ferroelectric transistor comprises a stacked structure of a ferroelectric layer and a semiconductor layer. The first electrode 3a is electrically connected to the gate electrode G. The second electrode 3b is electrically connected to the source electrode S.

(Vibration Energy Harvester 3)

Figure 3:
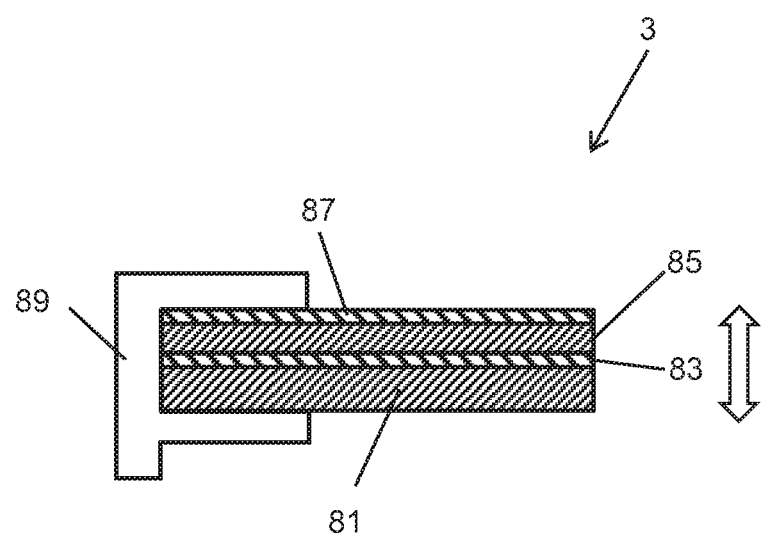
FIG. 3 shows a cross-sectional view of a vibration energy harvester included in the shock recording device according to the first embodiment.

Hereinafter, a structure and a fabrication method of the vibration energy harvester 3 will be described with reference to FIG. 3. FIG. 3 shows a side view of the vibration energy harvester 3. As shown in FIG. 3, the vibration energy harvester 3 has a cantilever structure. Specifically, the vibration energy harvester 3 has a stacked structure comprising a substrate 81, a first electrode layer 83 formed on the substrate 81, a piezoelectric layer 85 formed on the first electrode layer 83, and a second electrode layer 87 formed on the piezoelectric layer 85. The vibration energy harvester 3 further comprises a support 89. The support 89 supports the stacked structure so as to clip one end of the stacked structure in the cross-sectional view thereof. The first electrode layer 83 functions as the first electrode 3a. The second electrode layer 87 functions as the second electrode 3b.

Next, one example of a fabrication method of the vibration energy harvester 3 will be described with reference to FIG. 3. The substrate 81 is a stainless-steel plate having a thickness of 0.5 millimeters. A platinum layer having a thickness of 0.5 micrometers is deposited on this substrate 81 by a sputtering method. In this way, the first electrode layer 83 is formed. Then, a lead zirconate titanate layer having a thickness of 3 micrometers is deposited in an oxygen atmosphere by a sputtering method. In this way, the piezoelectric layer 85 is formed. A platinum layer having a thickness of 0.5 micrometers is deposited by a sputtering method. In this way, the second electrode layer 87 is formed. One end of the thus-formed stacked structure is clipped by a support 89 made of resin. In this way, the vibration energy harvester 3 is provided.

A shock is applied along a thickness direction of the vibration energy harvester 3. Even if the shock is applied, the end supported by the support 89 does not vibrate. On the other hand, the other end that is not supported by the support 89 swings along the thickness direction of the vibration energy harvester 3 when the shock is applied thereto. The vibration energy harvester 3 converts this swing into an electric energy which is generated as a potential difference between the first electrode layer 83 and the second electrode layer 87.

Specifically, for example, the vibration energy harvester 3 has a cantilever structure having a length of 6 millimeters and a width of 3 millimeters. When the vibration energy harvester 3 is dropped from the height of 30 millimeters, a potential difference of approximately 20 volts is generated between the first electrode layer 83 and the second electrode layer 87. The potential difference may be adjusted by changing the shape of the support 89 and by changing at least one of the size and the shape of the stacked structure. The potential difference may be adjusted by adding a weight to the other end of the stacked structure that is not supported by the support 89 or by changing the load of the weight.

As long as the external shock energy is converted into a potential difference between the first electrode 3a and the second electrode 3b, the structure of the vibration energy harvester 3 is not limited to the cantilever structure. Another example of the vibration energy harvester 3 is (i) an electret used for piezoelectric power generation or (ii) an oscillator device in which a bar magnet inserted into a coil is oscillated by the shock.

(Nonvolatile Memory 5)

An example of the nonvolatile memory 5 is a ferroelectric transistor. As shown in FIG. 1, the nonvolatile memory 5 comprises the drain electrode D, the source electrode S, and the gate electrode G. The drain electrode D and the source electrode S function as a pair of main electrodes. The gate electrode G functions as a control electrode. The vibration energy harvester 3 comprises the first electrode 3a and the second electrode 3b.

The gate electrode G is electrically connected to the first electrode 3a. The source electrode S is electrically connected to the second electrode 3b. The source electrode S and the drain electrode D are electrically connected to a first terminal 7 and a second terminal 9 of the shock recording device 1, respectively.

Since the drain electrode D is functionally equivalent to the source electrode S, the source electrode S and the drain electrode D may be electrically connected to the second terminal 9 and the first terminal 7, respectively.

As is described above, in the first embodiment, the nonvolatile memory 5 may be a ferroelectric transistor. The ferroelectric transistor has a gate insulation film formed of a ferroelectric substance. In the shock recording device disclosed in Japanese Patent Publication No. 55454178, Japanese Patent Application laid-open Publication No. 2004-061347A, or Japanese Patent Application laid-open Publication No. 2013-096931A, a ferroelectric capacitor is used as the ferroelectric memory. The ferroelectric capacitor is a passive device which has only a function of consuming the supplied electric power. On the other hand, the ferroelectric transistor is an active device in which the voltage or the electric current is varied depending on the supplied electric power.

In a case where the nonvolatile memory 5 is a ferroelectric transistor, what is necessary to obtain shock information recorded in the nonvolatile memory 5 is only to measure a resistance value between the first terminal 7 and the second terminal 9. On the other hand, in a case where the ferroelectric capacitor is used, the shock information recorded in the nonvolatile memory 5 fails to be obtained by measuring the resistance value of the ferroelectric capacitor. Accordingly, unlike the case where the ferroelectric capacitor is used, in a case where the nonvolatile memory 5 is a ferroelectric transistor, the shock information recorded in the nonvolatile memory 5 can be obtained easily.

Hereinafter, the case where the nonvolatile memory 5 is a ferroelectric transistor in the first embodiment will be described in more detail.

(Structure and Action of Ferroelectric Transistor)

Figure 2A:
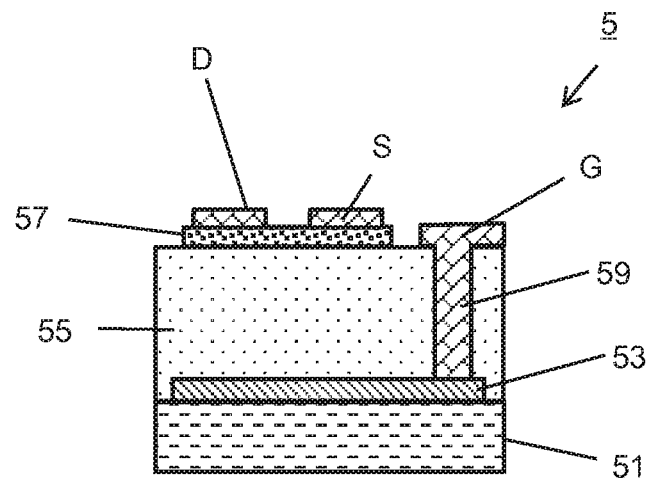
FIG. 2A shows a cross-sectional view of a ferroelectric transistor included in the shock recording device according to the first embodiment.
Figure 2B:
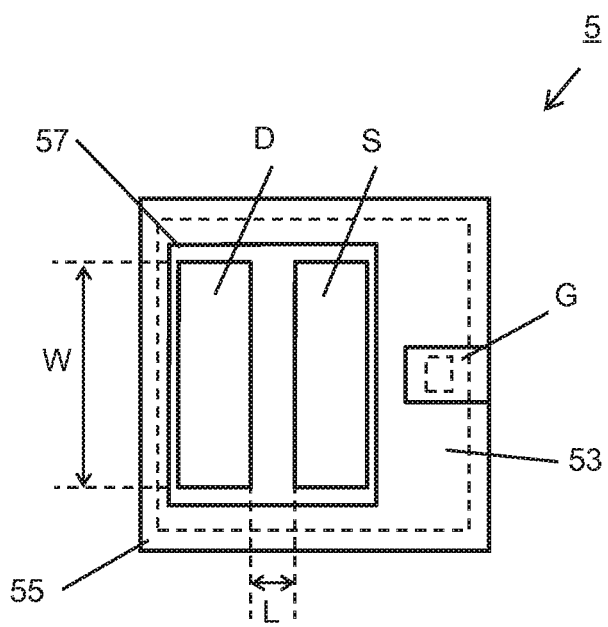
FIG. 2B shows a top view of the ferroelectric transistor included in the shock recording device according to the first embodiment.

FIG. 2A shows a cross-sectional view of the ferroelectric transistor 5. FIG. 2B shows a top view of the ferroelectric transistor 5.

As shown in FIG. 2A and FIG. 2B, the ferroelectric transistor 5 comprises a substrate 51; an electrode layer 53 formed on the substrate 51; a ferroelectric layer 55 formed on the electrode layer 53; the gate electrode G formed on the electrode layer 53; a semiconductor layer 57 formed on the ferroelectric layer 55; the drain electrode formed on the semiconductor layer 57; and the source electrode S formed on the semiconductor layer 57. The gate electrode G is electrically connected to the electrode layer 53 through a contact plug 59 formed by infilling a contact hole formed through the ferroelectric layer 55. The source electrode S and the drain electrode D are disposed on the semiconductor layer 57 at a certain interval.

Next, a mechanism for recording the shock information on the ferroelectric transistor 5 having such a structure will be described. Hereinafter, the term "upward direction" means a direction from the electrode layer 53 toward the semiconductor layer 57, and the term "downward direction" means a direction from the semiconductor layer 57 toward the electrode layer 53.

When a negative voltage with respect to the source electrode S is applied to the electrode layer 53 through the gate electrode G, a downward-direction polarization is generated in a part of the ferroelectric layer 55. For this reason, the part of the semiconductor layer 57 disposed on the part of the ferroelectric layer 55 has a high resistance value. In other words, when such a negative voltage is applied, the state of the part of the semiconductor layer 57 is changed into a high-resistance state. Even after the voltage is returned to 0 volts, the part of the semiconductor layer 57 remains in the high-resistance state.

On the other hand, when a positive voltage with respect to the source electrode S is applied to the electrode layer 53 through the gate electrode G, an upward-direction polarization is generated in a part of the ferroelectric layer 55. For this reason, the part of the semiconductor layer 57 disposed on the part of the ferroelectric layer 55 has a low resistance value. In other words, when such a positive voltage is applied, the state of the part of the semiconductor layer 57 is changed into a low-resistance state. Even after the voltage is returned to 0 volts, the part of the semiconductor layer 57 remains in the low-resistance state.

When an external shock is applied to the shock recording device 1 having such a ferroelectric transistor 5, a pulse voltage is generated between the first electrode 3a and the second electrode 3b of the vibration energy harvester 3. As a result, the pulse having a positive or negative voltage with respect to the source electrode S is applied to the gate electrode G. For this reason, the resistance value between the drain electrode D and the source electrode S is varied. An ammeter detects whether or not the resistance value between the first terminal 7 and the second terminal 9 has been varied. In this way, it is determined whether or not an external shock was applied to the shock recording device 1.

Hereinafter, this will be described in more detail. Desirably, before the shock recording device 1 is used, a voltage (hereinafter, referred to as "reset voltage") is applied between the source electrode S and the gate electrode G so that the semiconductor layer 57 is set to be a middle-resistance state. In the middle-resistance state, the semiconductor layer 57 has a lower resistance value than that of the high-resistance state and a higher resistance value than that of the low-resistance state. An example of the reset voltage is 2 volts.

Figure 5:
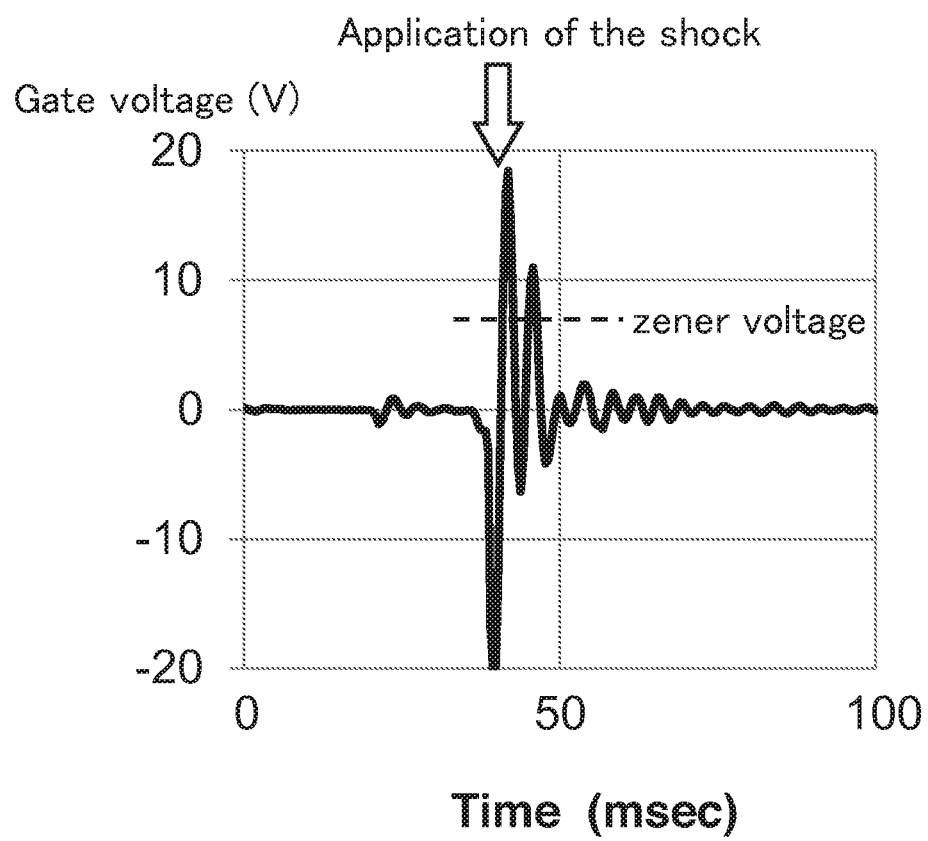
FIG. 5 is a graph showing a relation between time and the voltage generated by the vibration energy harvester when an external shock is applied to the shock recording device.

FIG. 5 is a graph showing a relation between time and the voltage generated by the vibration energy harvester 3 when an external shock is applied to the shock recording device 1. The vertical axis represents the generated voltage. When the generated voltage is positive, a pulse having a positive voltage and a pulse having a negative voltage are applied to the gate electrode G and the source electrode S, respectively. On the other hand, when the generated voltage is negative, a pulse having a negative voltage and a pulse having a positive voltage are applied to the gate electrode G and the source electrode S, respectively. As shown in FIG. 5, the peak value of the pulse having a positive or negative voltage generated by the external shock is approximately 20 volts. This peak voltage is significantly higher than the reset voltage. Such a pulse having a positive or negative voltage is applied to the gate electrode G to change the state of the semiconductor layer 57 into the low-resistance state or the high-resistance state. As is clear from the above description, the shock recording device 1 according to the first embodiment does not need a power source which is used to record the external shock.

Then, in order to read the resistance value of the semiconductor layer 57, a predetermined voltage is applied between the source electrode S and the drain electrode D. In this way, an electric current flowing between the source electrode S and the drain electrode D is measured. As a result, it is determined based on the resistance value of the semiconductor layer 57 whether or not an external shock was applied to the shock recording device 1. In other words, in a case where the semiconductor layer 57 is in the middle-resistance state, it is determined that no external shock was applied to the shock recording device 1. In a case where the semiconductor layer 57 is in the high-resistance state or in the low-resistance state, it is determined that an external shock was applied to the shock recording device 1.

As just described, the shock recording device 1 according to the first embodiment records the external shock using the potential difference output from the vibration energy harvester 3, namely, using only the pulse voltage. In other words, the shock recording device 1 records the external shock without using a battery.

(Method for Fabricating the Ferroelectric Transistor)

Hereinafter, an example of the fabrication method of the ferroelectric transistor 5 will be described with reference to FIG. 2A and FIG. 2B. First, a substrate 51 such as a silicon single crystalline substrate is subjected to heat treatment at a temperature of 1,100 degrees Celsius in an oxygen atmosphere. In this way, a silicon oxide layer having a thickness of 100 nanometers is formed on the surface of the substrate 51. Next, a noble metal layer such as a platinum layer is deposited on the substrate 51 at room temperature by a sputtering method. In this way, an electrode layer 53 having a thickness of 30 nanometers is formed.

Then, while the temperature of the substrate 51 is maintained at approximately 700 degrees Celsius, a lead zirconate titanate ($Pb(Zr,Ti)O_3$, hereinafter, referred to as "PZT") layer having a thickness of 450 nanometers is deposited by a pulse laser deposition method (hereinafter, referred to as "PLD method") on the electrode layer 53. In this way, a ferroelectric layer 55 is formed.

Next, while the temperature of the substrate 51 is maintained at 400 degrees Celsius, a zinc oxide layer having a thickness of 30 nanometers is deposited on the ferroelectric layer 55. A patterned resist is formed on the zinc oxide layer. Then, the zinc oxide layer is wet-etched using nitric acid. In this way, a semiconductor layer 57 is formed on the predetermined region of the ferroelectric layer 55. After the resist is removed, a resist to be used to etch the region of the ferroelectric layer 55 where the semiconductor layer 57 is not formed is formed on the ferroelectric layer 55 and the semiconductor layer 57. The ferroelectric layer 55 is wet-etched using hydrochloric acid to form a contact hole which penetrates the ferroelectric layer 55. The electrode layer 53 is exposed at the bottom of the contact hole. Subsequently, the resist is removed.

Next, the drain electrode D and the source electrode S are formed on the semiconductor layer 57. The gate electrode G is formed on the ferroelectric layer 55 so that the contact hole is filled in. Specifically, a patterned resist is formed on the semiconductor layer 57 and the ferroelectric layer 55. Then, a titanium layer having a thickness of 5 nanometers and a platinum layer having a thickness of 30 nanometers are deposited at room temperature by an electron beam deposition method. In this way, an electrode laminate is formed. At the same time, the electrode material is deposited into the contact hole. In this way, a contact plug 59 is formed. The electrode layer 53 is electrically connected to the gate electrode G through the contact plug 59. Subsequently, the drain electrode D, the source electrode S, and the gate electrode G are formed by a lift-off method.

In this way, the ferroelectric transistor 5 used in the shock recording device 1 according to the first embodiment is formed.

Second Embodiment

Next, the shock recording device 1 according to the second embodiment will be described.

In the first embodiment, before the shock recording device 1 is used, the semiconductor layer 57 is set to be the middle-resistance state. In more detail, a voltage of approximately 2 volts is applied between the source electrode S and the gate electrode G so that the semiconductor layer 57 is configured to be in the middle-resistance state. However, in a case where the shock applied to the vibration energy harvester 3 is small, a pulse having a voltage of only approximately 2 volts is generated by the vibration energy harvester 3. In such a case, although the shock is applied to the shock recording device 1, the resistance value of the semiconductor layer 57 does not change. As just described, in a case where the shock applied to the shock recording device 1 according to the first embodiment is small, the shock recording device 1 according to the first embodiment may fail to record the shock.

On the other hand, when a large shock is applied to the shock recording device 1, the vibration energy harvester 3 generates a large voltage. In a case where the vibration energy harvester 3 generates too large a voltage, a pulse having a significantly large voltage is applied to the gate electrode G. As a result, the ferroelectric transistor 5 may be broken down. The shock recording device 1 according to the first embodiment has these two problems, namely, (i) a problem that the shock recording device 1 according to the first embodiment fails to record a small shock, and (ii) a problem that the shock recording device 1 according to the first embodiment is broken down due to a large shock.

Figure 4A:
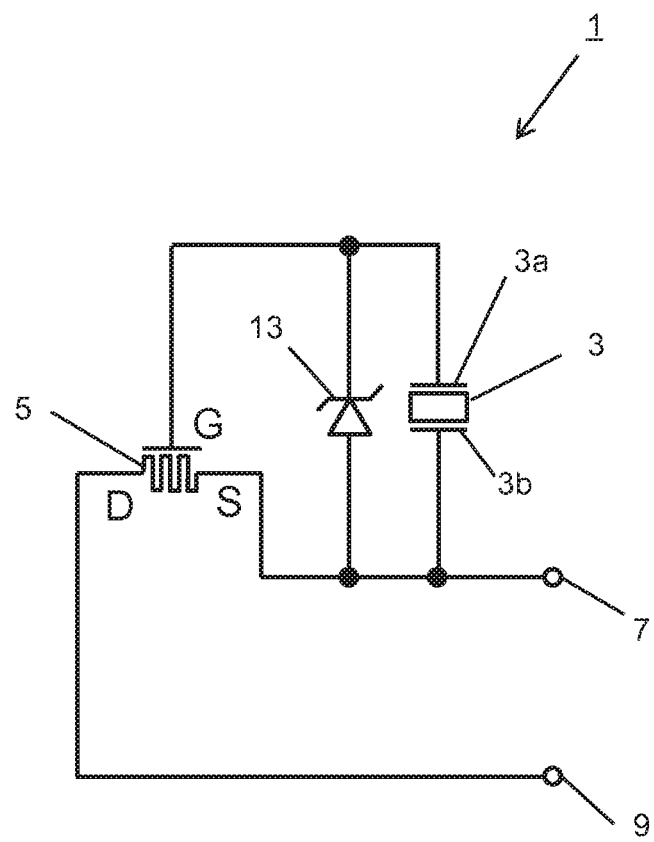
FIG. 4A shows a circuit diagram of a shock recording device according to a second embodiment.

The shock recording device 1 according to the second embodiment solves these two problems. FIG. 4A shows a circuit diagram of the shock recording device 1 according to the second embodiment. As shown in FIG. 4A, the shock recording device 1 according to the second embodiment is similar to that of the first embodiment, except that a zener diode 13 is electrically connected in parallel with the vibration energy harvester 3.

Specifically, the cathode terminal of the zener diode 13 is electrically connected to the gate electrode G of the ferroelectric transistor 5. In other words, the cathode terminal of the zener diode 13 is electrically connected to the first electrode 3a. The anode terminal of the zener diode 13 is electrically connected to the source electrode S of the ferroelectric transistor 5. In other words, the anode terminal of the zener diode 13 is electrically connected to the second electrode 3b.

Before the shock recording device 1 according to the second embodiment is used, the semiconductor layer 57 is set to be in the high-resistance state.

When a pulse voltage by which a pulse having a negative voltage and a pulse having a positive voltage are respectively applied to the gate electrode G and the source electrode S is generated by applying a shock to the vibration energy harvester 3, a forward bias is applied to the zener diode 13. As a result, a short circuit is formed from the second electrode 3b to the first electrode 3a through the anode and cathode terminals of the zener diode 13. For this reason, a voltage is hardly applied to the gate electrode G. Hence, the semiconductor layer 57 remains in the high-resistance state.

Next, a pulse voltage by which a pulse having a positive voltage and a pulse having a negative voltage are respectively applied to the gate electrode G and the source electrode S is generated by applying a shock to the vibration energy harvester 3, a reverse bias is applied to the zener diode 13. As a result, a pulse having a positive voltage is applied to the gate electrode G. This positive voltage lowers the resistance value of the semiconductor layer 57. In other words, this positive voltage causes the semiconductor layer 57 to be in the low-resistance state.

Figure 6:
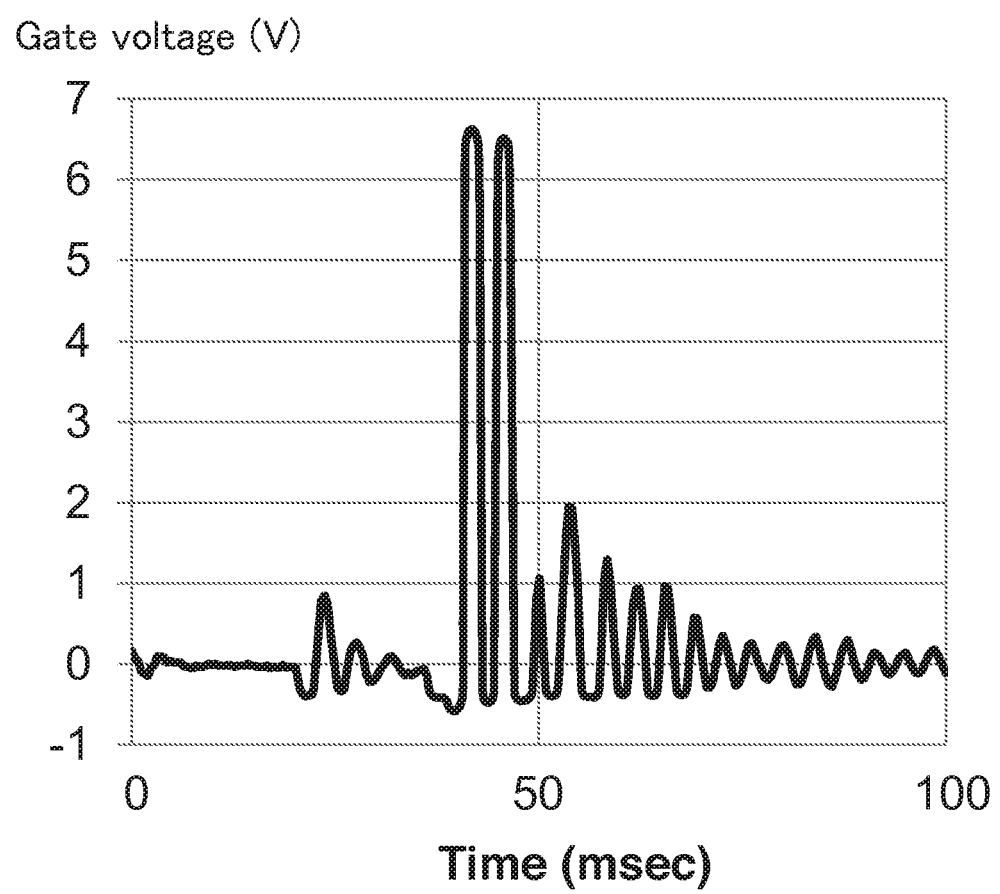
FIG. 6 is a graph showing a relation between time and the voltage of a gate electrode when an external shock is applied to the shock recording device according to the second embodiment.

FIG. 6 is a graph showing a relation between time and the voltage of the gate electrode G when an external shock is applied to the shock recording device 1 according to the second embodiment. In FIG. 5, since the voltage generated by the vibration energy harvester 3 is directly applied to the gate electrode G, a pulse having either a positive or negative voltage is applied to the gate electrode G. On the other hand, in FIG. 6, due to the zener diode 13, only a pulse having a substantially positive voltage is applied to the gate electrode G. In other words, unlike the case of the first embodiment, a pulse having a negative voltage is hardly applied to the gate electrode G in the second embodiment. For this reason, even in the case where the shock applied to the shock recording device 1 is small, the pulse having the positive voltage is applied to the gate electrode G. As a result, the state of the semiconductor layer 57 is surely changed from the high-resistance state to the low-resistance state. For this reason, unlike the shock recording device 1 according to the first embodiment, the shock recording device 1 according to the second embodiment records the small shock.

Hereinafter, the present inventors consider a case where a significantly large shock is applied to the shock recording device 1. In a case where a pulse having a positive voltage more than the zener voltage (e.g., 15 volts) of the zener diode 13 is applied to the cathode terminal of the zener diode 13, an electric current flows suddenly through the zener diode 13 due to the avalanche breakdown of the zener diode 13. As a result, a short circuit is formed from the first electrode 3a to the second electrode 3b through the cathode and anode terminals of the zener diode 13. For this reason, a voltage is hardly applied to the gate electrode G. Hence, the state of the semiconductor layer 57 does not change. As just described, unlike the case of the first embodiment, in the second embodiment, even in the case where the vibration energy harvester 3 generates a large voltage by applying a significantly large shock to the shock recording device 1, the ferroelectric transistor 5 is not broken down. As is clear from FIG. 6, a positive voltage more than the zener voltage (e.g., 15 volts) of the zener diode 13 is not applied to the gate electrode G. In other words, the voltage applied to the gate electrode G is not more than the zener voltage of the zener diode 13.

As just described, the shock recording device 1 according to the second embodiment has two advantages that the shock recording device 1 records a small shock and that the shock recording device 1 is not broken down by applying a large shock thereto.

First Variation of Second Embodiment

Figure 4B:
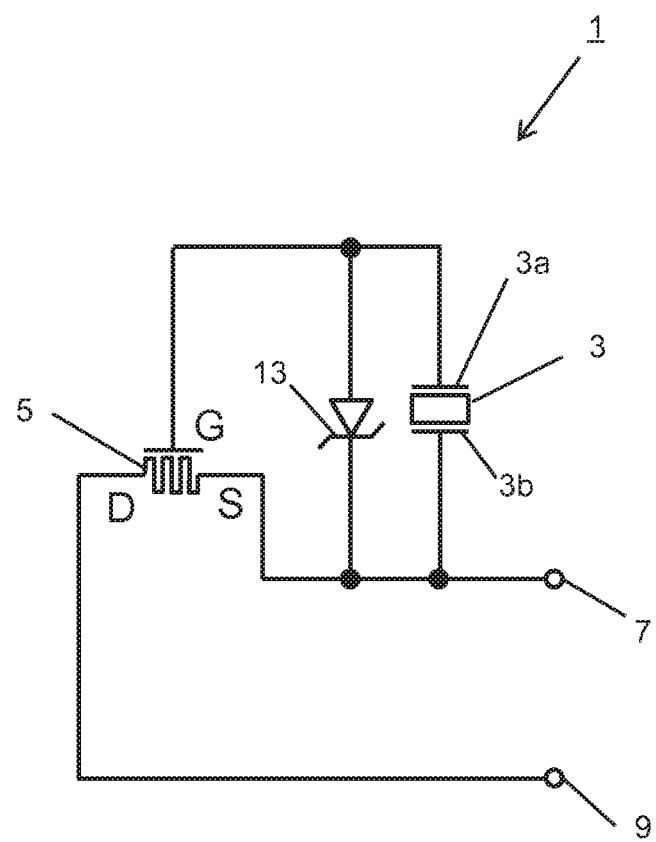
FIG. 4B shows a circuit diagram of the shock recording device according to a first variation of the second embodiment.

FIG. 4B shows a circuit diagram of the shock recording device 1 according to a first variation of the second embodiment. The shock recording device 1 shown in FIG. 4B is similar to the shock recording device 1 shown in FIG. 4A, except that the direction of the zener diode 13 is reversed. The shock recording device 1 shown in FIG. 4B is set to be in the low-resistance state before use. When a shock is applied to the shock recording device 1 shown in FIG. 4B, the state of the semiconductor layer 57 is changed to the high-resistance state. The first variation can be applied to the shock recording device 1 according to the third embodiment which will be described later.

Second Variation of Second Embodiment

Figure 7:
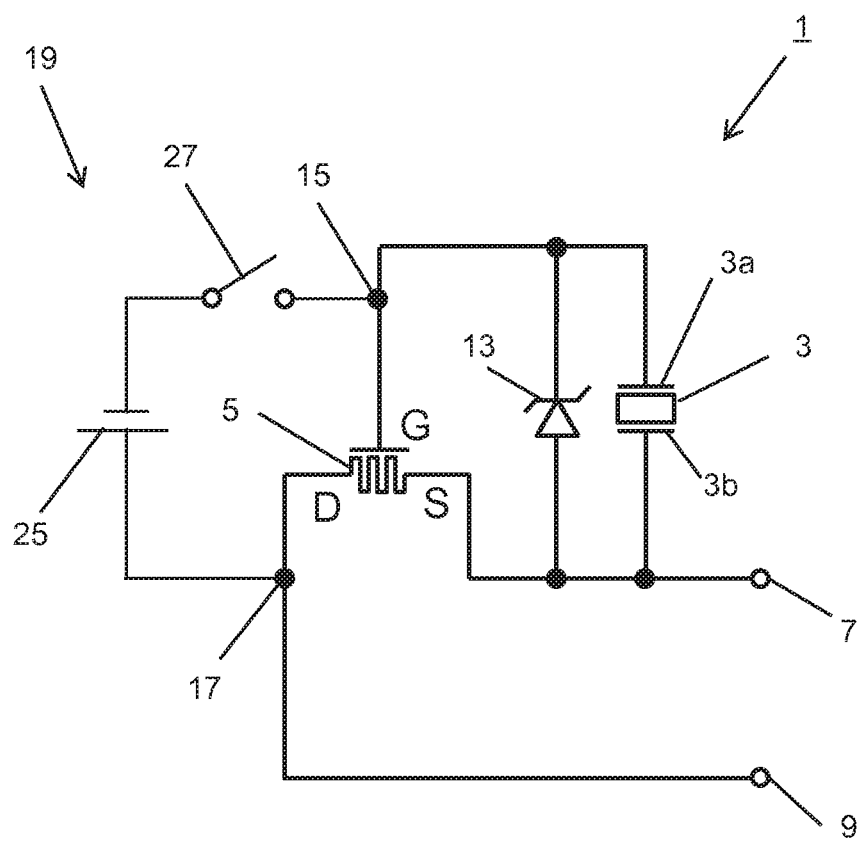
FIG. 7 shows a circuit diagram of the shock recording device according to a second variation of the second embodiment.

FIG. 7 shows a circuit diagram of the shock recording device 1 according to a second variation of the second embodiment. The shock recording device 1 shown in FIG. 7 is similar to the shock recording device 1 shown in FIG. 4A, except that a reset voltage generation circuit 19 is added.

The reset voltage generation circuit 19 comprises a DC power source 25 and a switch 27. The positive electrode of the DC power source 25 is electrically connected to the drain electrode D through a node 17. The negative electrode of the DC power source 25 is electrically connected to the gate electrode G through a node 15. The switch 27 is electrically interposed between the node 15 (or the node 17) and the DC power source 25.

When the ferroelectric transistor 5 is reset, the switch 27 is turned on. Positive and negative voltages are applied to the drain electrode D and the gate electrode G from the DC power source 25, respectively. For this reason, the semiconductor layer 57 is set to be in the high-resistance state. In this way, the state of the semiconductor layer 57 is returned to an initial state, namely, the high-resistance state. In the case of the first variation of the second embodiment (see FIG. 4B), the positive and negative electrodes of the DC power source 25 are electrically connected to the drain electrode D and the gate electrode G, respectively, and the semiconductor layer 57 is set to be in the low-resistance state by the switch 27.

Third Embodiment

Figure 8:
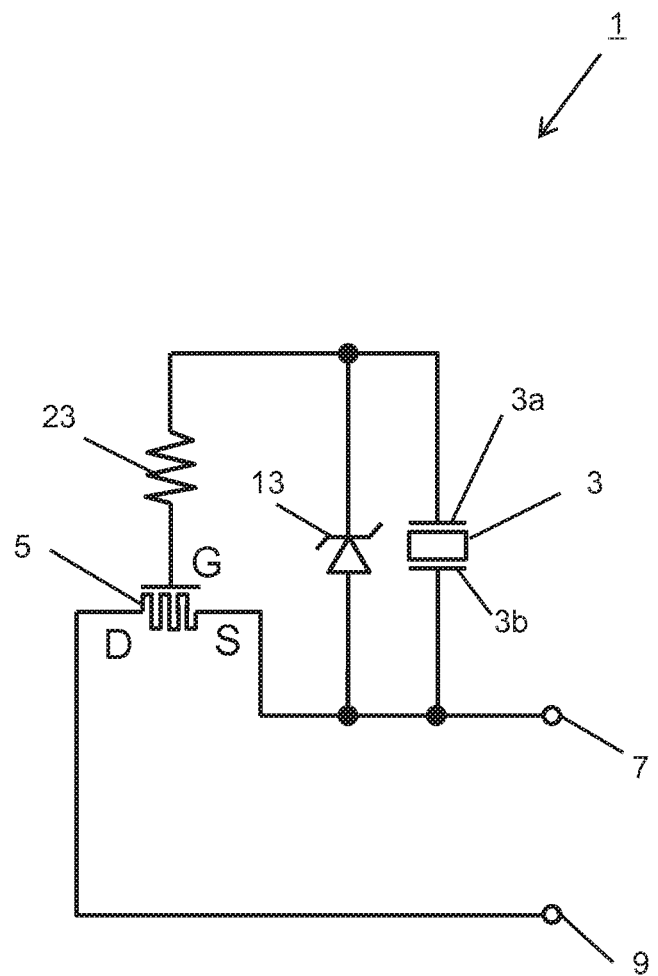
FIG. 8 shows a circuit diagram of a shock recording device according to a third embodiment.

Next, the shock recording device 1 according to the third embodiment will be described. FIG. 8 shows a circuit diagram of the shock recording device 1 according to the third embodiment. The shock recording device 1 according to the third embodiment is similar to the shock recording device 1 according to the second embodiment, except that a resistance 23 is electrically connected to the gate electrode G. The resistance 23 is electrically interposed between the gate electrode G and the first electrode 3a. The resistance 23 is electrically interposed between the gate electrode G and the cathode terminal of the zener diode 13.

Since the resistance 23 having a resistance value R is provided, the number of shocks applied to the shock recording device 1 is recorded in the shock recording device 1. A gate capacitance $C_G$ is formed between the gate electrode G and the source electrode S (or the drain electrode D) of the ferroelectric transistor 5. A CR filter is formed by the gate capacitance $C_G$ and the resistance value R. By the action of the CR filter, the shock recording device 1 records the number of shocks applied thereto.

Figure 9:
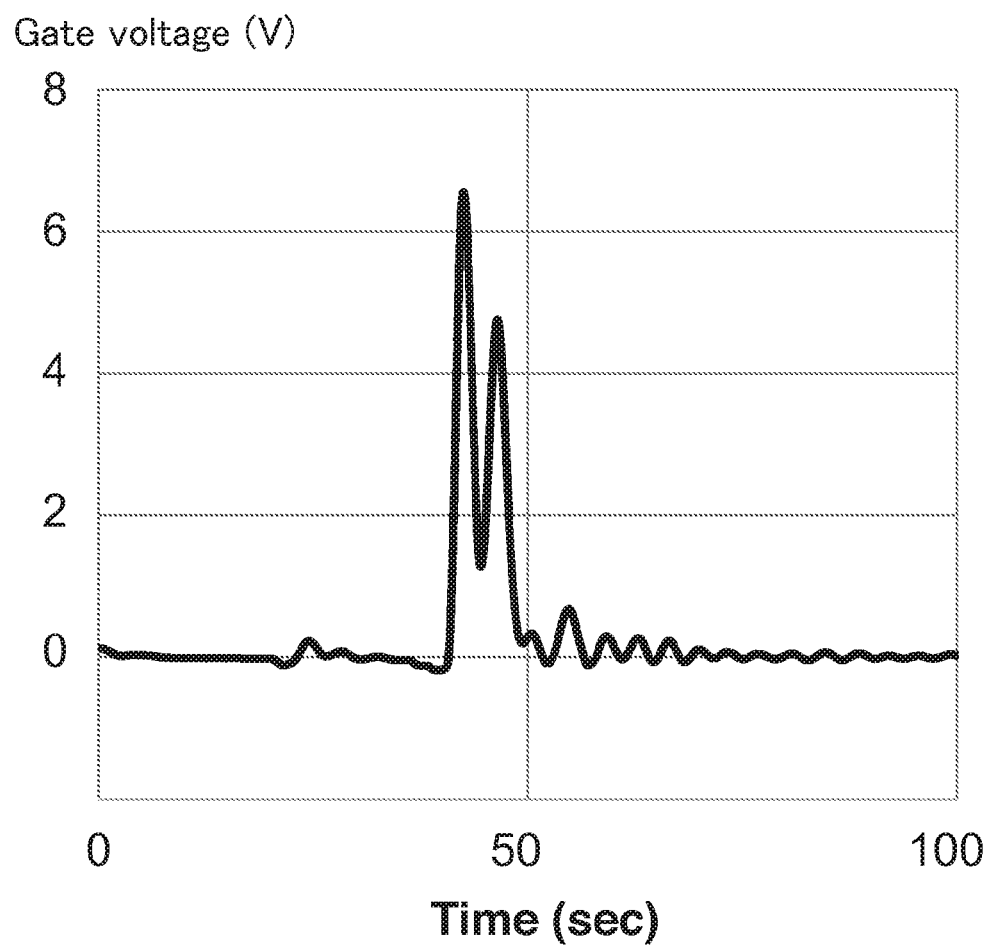
FIG. 9 is a graph showing a relation between a shock applied to the shock recording device according to the third embodiment and a voltage applied to the gate electrode.

FIG. 9 is a graph showing a relation between a shock applied to the shock recording device 1 according to the third embodiment and a voltage applied to the gate electrode G. Similarly to the case of the second embodiment, a pulse having a substantially positive voltage with respect to the source electrode S is applied to the gate electrode G by the action of the zener diode 13. A negative voltage is hardly applied to the gate electrode G. Furthermore, the amplitude of the wave shape of the positive voltage included in FIG. 5 is reduced by the action of the CR filter.

More specifically, in FIG. 5, after a shock is applied, a pulse having a positive voltage of approximately 20 volts is generated. Just after the pulse having a positive voltage of 20 volts (hereinafter, referred to as "first positive voltage") is generated, a pulse having a positive voltage of approximately 10 volts (hereinafter, referred to as "second positive voltage") is generated. Since each of the peak values of the these pulses is more than the zener voltage $V_z$ (e.g., 6.5 volts) of the zener diode 13, a pulse having a positive voltage equal to the zener voltage $V_z$ is applied to the gate electrode G in the second embodiment. For this reason, as shown in FIG. 6, the first positive voltage is applied to the gate electrode G as a pulse having a voltage of approximately 6.5 volts. The second positive voltage is also applied to the gate electrode G as a pulse having a voltage of approximately 6.5 volts.

As just described, in the second embodiment, the pulses each having a voltage more than the zener voltage $V_z$ are applied to the gate electrode G as the pulses each having the zener voltage $V_z$, without any exception. In other words, in the second embodiment, when a voltage more than the zener voltage $V_z$ is generated by the vibration energy harvester 3, a pulse having a voltage equal to the zener voltage $V_z$ is applied to the gate electrode G. For this reason, the first positive voltage and the second positive voltage are not distinguished from each other.

However, in FIG. 9, by the action of the CR filter, the pulse having a first positive voltage of 20 volts is converted into a pulse having a voltage of approximately 7.5 volts, and the pulse having a second positive voltage of 10 volts is converted into a pulse having a voltage of approximately 6.1 volts. As just described, even when a voltage more than the zener voltage $V_z$ is generated by the vibration energy harvester 3, the amplitude of the wave shape of the positive voltage generated by the vibration energy harvester 3 is reduced in the third embodiment so that the pulse having the first positive voltage is distinguishable from the pulse having the second positive voltage. In many cases, the first positive voltage (e.g., 20 volts) is larger than the second positive voltage (e.g., 10 volts). Accordingly, even after converted by the CR filter, the first positive voltage (e.g., 7.5 volts) is larger than the second positive voltage (e.g., 6.1 volts)

For this reason, even when the vibration energy harvester 3 is vibrated more than once in one shock, each of the pulses having a second or later positive voltage has a lower peak value than the pulse having the first positive voltage. It would be obvious that the peak value of the first positive voltage is larger than the peak values of the second and later positive voltages.

As demonstrated in the inventive examples 3A-3E which will be described later, the present inventors found that the shock recording device 1 according to the third embodiment records the number of shocks applied thereto in a case where the following mathematical formula (I) is satisfied.

$$0.7 \text{ milliseconds} \leq \text{time constant } \tau \text{ (second)} \leq 7.0 \text{ milliseconds} \quad (I)$$

where the time constant τ (second) is equal to the product of (the resistance value R)·(the gate capacitance $C_G$)

the resistance value R represents the resistance value of the resistance 23, and the gate capacitance $C_G$ represents the gate capacitance of the ferroelectric transistor 5.

In case where the time constant τ is less than 0.7 milliseconds, the shock recording device 1 may fail to record the second or later shock applied thereto. In other words, the resistance value of the semiconductor layer 57 may not change even when the second shock is applied to the shock recording device 1. In more detail, when the first shock is applied to the shock recording device 1, the semiconductor layer 57 is changed from the high-resistance state to the low-resistance state. However, even when the second shock is applied to the shock recording device 1, the resistance value of the semiconductor layer 57 may not change. As a result, the shock recording device 1 fails to record the number of shocks applied thereto. See the comparative example 3a which will be described later.

In case where the time constant τ is more than 7.0 milliseconds, the shock recording device 1 fails to record the shocks applied thereto, even if the zener voltage $V_z$ is significantly high. In other words, even if a shock is applied, the resistance value of the semiconductor layer 57 does not change. More specifically, even when the first shock is applied to the shock recording device 1, the resistance value of the semiconductor layer 57 does not change. Similarly, even when the second shock is applied to the shock recording device 1, the resistance value of the semiconductor layer 57 does not change. As a result, the shock recording device 1 fails to record the number of shocks applied thereto. See the comparative examples 3b-3c which will be described later.

As long as the time constant τ is not less than 0.7 milliseconds and not more than 7.0 milliseconds, the zener voltage $V_z$ can be selected appropriately by a skilled person. The desirable zener voltage $V_z$ falls within the range of not less than 3 volts and not more than 15 volts.

First Specific Embodiment of the Resistance 23

Figure 10A:
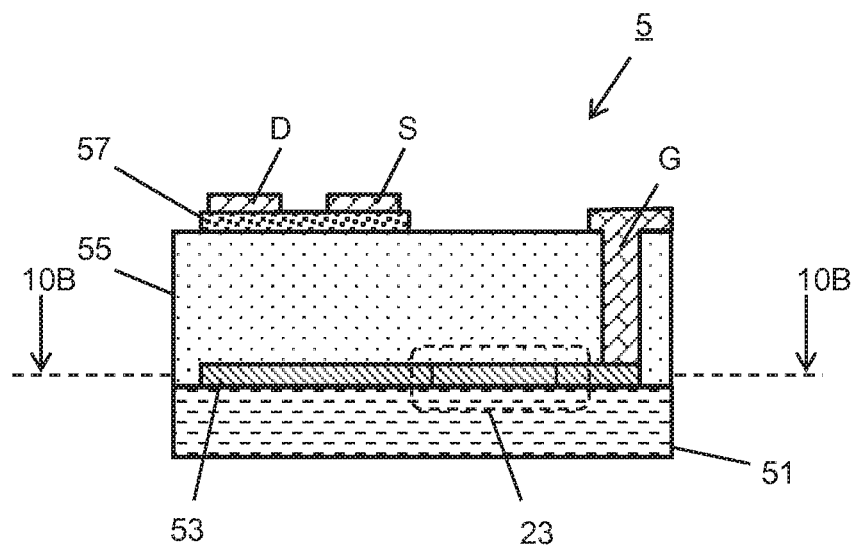
FIG. 10A shows a cross-sectional view of a ferroelectric transistor included in the shock recording device according to the third embodiment.
Figure 10B:
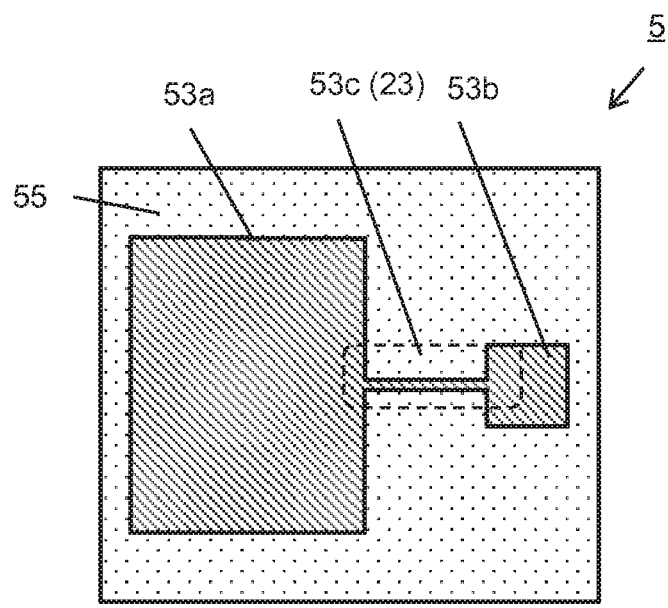
FIG. 10B shows a top view taken along the line 10B-10B included in FIG. 10A.

Hereinafter, a first specific embodiment of the resistance 23 will be described. FIG. 0.10A shows a cross-sectional view of the ferroelectric transistor 5 included in the shock recording device 1 according to the third embodiment. FIG. 10B shows a top view taken along the line 10B-10B included in FIG. 10A. The resistance 23 may be formed of the material same as that of the gate electrode G.

Specifically, the shape of the electrode layer 53 is changed so that a region which serves as the resistance 23 is formed.

As shown in FIG. 10B, the electrode layer 53 is composed of a first region 53a, a second region 53b, and a narrowed part 53c. The first region 53a is opposite to the region including the source electrode S and the drain electrode D. The second region 53b is electrically connected to the gate electrode G through the contact plug 59. The narrowed part 53c is interposed between the first region 53a and the second region 53b when viewed in the top view. The narrowed part 53c serves as the resistance 23. The narrowed part 53c may be formed easily by a conventional semiconductor process.

Figure 11:
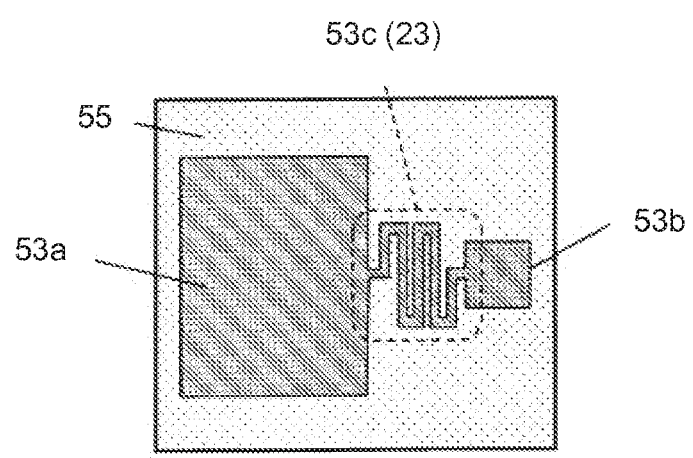
FIG. 11 shows a top view of a variation of a resistance.

FIG. 11 shows a top view of the resistance 23 according to a variation of the first specific embodiment. The narrowed part 53c may have a shape of meanderings.

Desirably, in order to increase the impact resistance of the resistance 23, the narrowed part 53c is disposed near the center of the surface of the substrate 51, as shown in FIG. 10B and FIG. 11.

Second Specific Embodiment of the Resistance 23

Figure 12A:
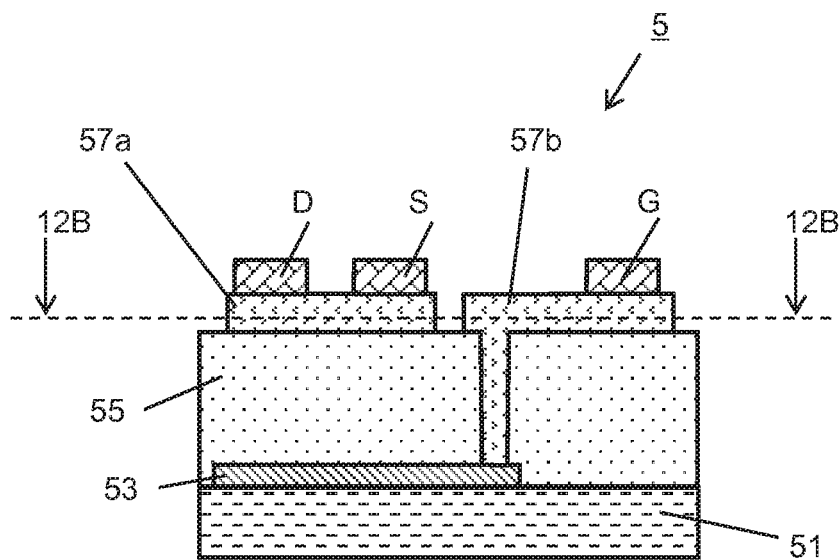
FIG. 12A shows a cross-sectional view of the ferroelectric transistor included in the shock recording device according to the third embodiment.
Figure 12B:
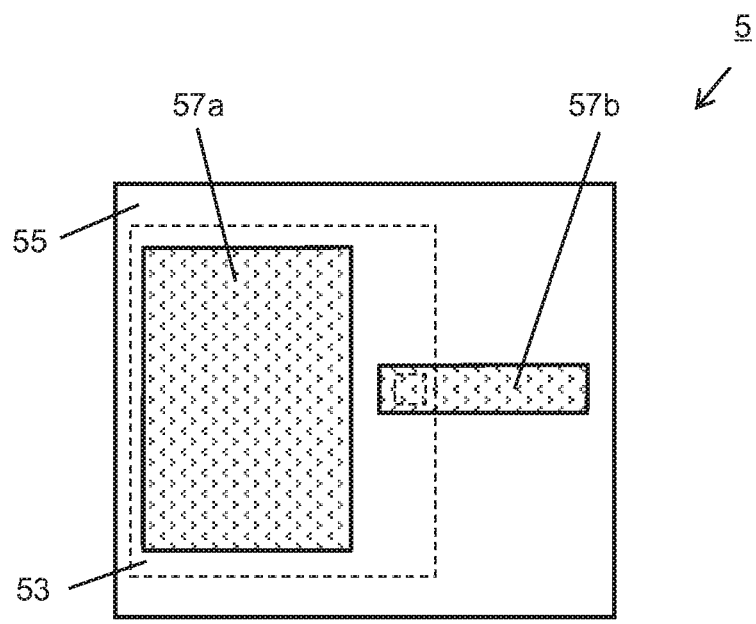
FIG. 12B shows a top view taken along the line 12B-12B included in FIG. 12A.

Next, a second specific embodiment of the resistance 23 will be described. FIG. 12A shows a cross-sectional view of the ferroelectric transistor 5 included in the shock recording device 1 according to the third embodiment. FIG. 12B shows a top view taken along the line 12B-12B included in FIG. 12A. The resistance 23 may be formed of the material same as that of the semiconductor layer 57.

Specifically, the shape of the semiconductor layer 57 is changed so that a region which serves as the resistance 23 is formed.

In other words, the semiconductor layer 57 is composed of a first semiconductor region 57a and a second semiconductor region 57b when viewed in a top view. The first semiconductor region 57a comprises the source electrode S and the drain electrode D on the surface thereof. The second semiconductor region 57b is separated and insulated from the first semiconductor region 57a. The second semiconductor region 57b has the gate electrode G on the surface thereof. The second semiconductor region 57b serves as the resistance 23.

Similarly to the case of the first specific embodiment, the second semiconductor region 57b may have a shape of meanderings.

Desirably, in order to increase the impact resistance of the resistance 23, the second semiconductor region 57b is disposed near the center of the surface of the substrate 51.

EXAMPLES

Hereinafter, the present invention will be described in more detail with reference to the following examples.

Inventive Example 1

Fabrication of the Vibration Energy Harvester 3

First, a method for fabricating the vibration energy harvester 3 is described below.

A substrate 81 having a size of 2 millimeters×7 millimeters was obtained by a laser processing method from a stainless-steel plate having a thickness of 0.1 millimeter.

While the substrate 81 was maintained at 400 degrees Celsius, a platinum layer was formed on the substrate 81 by a sputtering method in an argon atmosphere. In this way, a first electrode layer 83 having a thickness of 500 nanometers was formed.

While the substrate 81 was maintained at 600 degrees Celsius, a piezoelectric layer 85 formed of PZT was formed by a sputtering method in an oxygen atmosphere. In this way, the piezoelectric layer 85 having a thickness of 3 micrometers was formed.

Another platinum layer was formed on the substrate 81 by a sputtering method in an argon atmosphere at room temperature. In this way, a second electrode layer 87 having a thickness of 100 nanometers was formed to give a stacked structure of the substrate 81/the first electrode layer 83/the piezoelectric layer 85/the second electrode layer 87.

A support 89 formed of resin was fixed to one end of the stacked structure. A weight of 30 milligrams was fixed to the other end of the stacked structure. In this way, a vibration energy harvester 3 having a shape of a cantilever was provided.

When a shock was applied to this vibration energy harvester 3, an alternate current having a frequency of 250 Hz was output through the first electrode layer 83 and the second electrode layer 87.

(Fabrication of the Ferroelectric Transistor 5)

Next, a method for fabricating the ferroelectric transistor 5 will be described below.

First, a substrate formed of silicon single crystal was exposed to an oxygen atmosphere at a temperature of 1,100 degrees Celsius. In this way, a silicon oxide layer having a thickness of 100 nanometers was formed on the surface of the silicon single crystalline substrate.

Then, while the substrate was heated to 400 degrees Celsius, platinum was deposited on the substrate by a sputtering method. In this way, an electrode layer 53 formed of platinum was formed. The electrode layer 53 had a thickness of 30 nanometers.

While the substrate was heated to 700 degrees Celsius, a layer of lead zirconate titanate (PZT) represented by the chemical formula $Pb(Zr,Ti)O_3$ was formed by a pulse laser deposition method (hereinafter, referred to as "PLD method") on the electrode layer 53. In this way, a ferroelectric layer 55 formed of PZT was formed. The ferroelectric layer 55 had a thickness of 450 nanometers.

While the substrate was heated to 400 degrees Celsius, a layer of zinc oxide represented by the chemical formula $ZnO$ was formed on the ferroelectric layer 55. In this way, the zinc oxide layer was formed. The zinc oxide layer had a thickness of 30 nanometers. Furthermore, the zinc oxide layer was patterned using nitric acid. In this way, a semiconductor layer 57 formed of zinc oxide was formed.

By pattering the ferroelectric layer 55 using hydrochloric acid, the contact hole which penetrates the ferroelectric layer 55 was formed. The electrode layer 53 was exposed on the bottom of the contact hole.

A stacked structure including a titanium film having a thickness of 5 nanometers and a platinum film having a thickness of 30 nanometers was deposited on the semiconductor layer 57. The source electrode S and the drain electrode D were formed by pattering the stacked structure. The stacked structure was deposited onto the inside of the contact hole to give a contact plug 59 formed of titanium and platinum. In this way, the ferroelectric transistor 5 was provided. The ferroelectric transistor 5 had a size of 2 millimeters×2 millimeters when viewed in the top view.

The gate width W and the gate length L shown in FIG. 2B were equal to 100 micrometers and 3 micrometers, respectively, in the inventive example 1.

Finally, the vibration energy harvester 3 and the ferroelectric transistor 5 were disposed on a circuit board (not shown) to provide the shock recording device 1 according to the inventive example 1. The shock recording device 1 according to the inventive example 1 had the electric circuit shown in FIG. 1.

(Application of Shock)

Next, the shock recording device 1 according to the inventive example 1 was dropped from the height of 10 millimeters. In this way, a shock was applied to the shock recording device 1 according to the inventive example 1. Before and after the dropping, the resistance value of the semiconductor layer 57 was measured through the first terminal 7 and the second terminal 9 by an ammeter. The following Table 1 shows the results.

TABLE 1

| State | Resistance value |
|---|---|
| Before the shock was applied | 12 megohms |
| After the shock was applied | 0.287 megohms |

As is clear from Table 1, the resistance value after the shock was applied is significantly smaller than the resistance value before the shock was applied. Therefore, it is possible to determine whether or not the shock was applied to the shock recording device 1 based on the resistance value of the semiconductor layer 57.

Inventive Example 2

The shock recording device 1 having the electric circuit shown in FIG. 4A was provided using a zener diode (available from Rohm Co., Ltd., product name: KDZTR6.2B) and the shock recording device 1 fabricated in the inventive example 1. The zener diode had a zener voltage of 6.2 volts.

(Application of the Reset Voltage)

A reset voltage was applied to the shock recording device 1 according to the inventive example 2. Specifically, the DC power source 25 having a voltage of 7 volts was used, as shown in FIG. 7. The switch 27 was turned on, and a voltage of 7 volts was applied between the gate electrode G and the drain electrode D so that a positive voltage was applied to the drain electrode D with respect to the gate electrode G. In this way, the semiconductor layer 57 was set to be in a high-resistance state. A resistance value between the first terminal 7 and the second terminal 9 was measured using an amperometry device.

(Application of the Shock)

Then, a shock was applied to the shock recording device 1 according to the inventive example 2. Specifically, the shock recording device 1 according to the inventive example 2 was dropped from the height of 10 centimeters to an iron plate. In this way, the shock was applied to the shock recording device 1 according to the inventive example 2. FIG. 5 is a graph showing a relation between time and the voltage generated by the vibration energy harvester 3 when the shock was applied to the shock recording device 1 in the inventive example 2. FIG. 6 is a graph showing a relation between time and the voltage of the gate electrode G when the shock was applied to the shock recording device 1 according to the inventive example 2.

As is clear from FIG. 6, by the action of the zener diode, the gate voltage Vg is substantially positive with respect to the voltage of the source electrode S. In other words, by the action of the zener diode, no pulse having a negative voltage is applied to the gate electrode G. For a similar reason, no pulse having a voltage more than 6.5 volts is applied to the gate electrode G.

(Measurement of the Electric Current)

Finally, the resistance value between the first terminal 7 and the second terminal 9, namely, the resistance value of the semiconductor layer 57, was measured again using the amperometry device. Furthermore, a second shock was applied to the shock recording device 1 according to the inventive example 2, similarly to the case of the first shock. Then, the resistance value of the semiconductor layer 57 was measured again. Table 2 shows the results of the measurement of the resistance value of the semiconductor layer 57.

TABLE 2

| State | Resistance value |
|---|---|
| Before the shock was applied | 120 megohms |
| After the first shock was applied | 0.121 megohms |
| After the second shock was applied | 0.121 megohms |

As is clear from Table 2, after the shock is applied, the resistance value of the semiconductor layer 57 decreases significantly. Therefore, it is possible to determine whether or not the shock was applied to the shock recording device 1 based on the resistance value of the semiconductor layer 57.

Inventive Example 3A

Similarly to the case of the method for fabricating the ferroelectric transistor 5 described in the inventive example 1, a ferroelectric transistor 5 was fabricated. In particular, in the inventive example 3A, the ferroelectric layer 55 had a thickness of 450 nanometers and a relative permittivity of 600. The semiconductor layer 57 had a size of 120 micrometers×141 micrometers. In this way, the ferroelectric transistor 5 having a gate capacity $C_G$ of 200 pF was fabricated.

A shock recording device 1 having the electric circuit shown in FIG. 8 was fabricated on the circuit board, using a resistance having a resistance value of 10.0 megohms, the vibration energy harvester 3 fabricated in the inventive example 1, the ferroelectric transistor 5 having a gate capacity $C_G$ of 200 pF, and a zener diode having a zener voltage of 15 volts. In this way, the ferroelectric transistor 5 according to the inventive example 3A was provided. The ferroelectric transistor 5 according to the inventive example 3A had a time constant of 2 milliseconds (=200 pF×10.0 megohms).

(Application of the Reset Voltage)

Similarly to the case of the inventive example 2, a reset voltage was applied to the shock recording device 1 according to the inventive example 3A. In this way, the semiconductor layer 57 was set to be in a high-resistance state.

(Application of the Shock)

Then, a shock was applied to the shock recording device 1 according to the inventive example 3A. Specifically, the shock recording device 1 according to the inventive example 3A was dropped from the height of 10 centimeters to the iron plate. In this way, the first shock was applied to the shock recording device 1 according to the inventive example 3A.

(Measurement of the Electric Current)

Finally, the resistance value between the first terminal 7 and the second terminal 9, namely, the resistance value of the semiconductor layer 57, was measured using the amperometry device. Furthermore, a second shock was applied to the shock recording device 1 according to the inventive example 3A, similarly to the case of the first shock. Then, the resistance value of the semiconductor layer 57 was measured again using the amperometry device. A third shock was applied to the shock recording device 1 according to the inventive example 3A, similarly to the case of the first shock. Then, the resistance value of the semiconductor layer 57 was measured again using the amperometry device.

Table 3 shows the results of the measurement of the resistance value of the semicondcutor layer 57.

TABLE 3

| State | Resistance value |
|---|---|
| Before the shock was applied | 120 megohms |
| After the first shock was applied | 1.3 megohms |
| After the second shock was applied | 0.298 megohms |
| After the third shock was applied | 0.121 megohms |

As is clear from Table 3, the resistance value of the semiconductor layer 57 was lowered significantly with an increase in the number of shocks. Therefore, it is possible to determine how many shocks were applied to the shock recording device 1 according to the inventive example 3A based on the resistance value of the semiconductor layer 57.

Inventive Example 3B

An experiment similar to the inventive example 3A was performed, except using a resistance having a resistance value of 3.5 megohms. Table 4 and Table 5 show the results.

Inventive Example 3C

An experiment similar to the inventive example 3A was performed, except using a resistance having a resistance value of 35 megohms. Table 4 and Table 5 show the results.

Inventive Example 3D

An experiment similar to the inventive example 3A was performed, except using a zener diode having a zener voltage of 3 volts and except using a resistance having a resistance value of 3.5 megohms. Table 4 and Table 5 show the results.

Inventive Example 3E

An experiment similar to the inventive example 3A was performed, except using a zener diode having a zener voltage of 3 volts and except using a resistance having a resistance value of 35 megohms. Table 4 and Table 5 show the results.

Comparative Example 3a

An experiment similar to the inventive example 3A was performed, except using a resistance having a resistance value of 0.5 megohms. Table 4 and Table 5 show the results.

Comparative Example 3b

An experiment similar to the inventive example 3A was performed, except using a resistance having a resistance value of 100.0 megohms. Table 4 and Table 5 show the results.

Reference Example 3a

An experiment similar to the inventive example 3A was performed, except using a zener diode having a zener voltage of 3 volts and except using a resistance having a resistance value of 0.5 megohms. Table 4 and Table 5 show the results.

Comparative Example 3c

An experiment similar to the inventive example 3A was performed, except using a zener diode having a zener voltage of 3 volts and except using a resistance having a resistance value of 100 megohms. Table 4 and Table 5 show the results.

TABLE 4

| | zener voltage (volt) | Time constant (msec) | Gate capacity $C_G$ (pF) | Resistance value (megohm) |
|---|---|---|---|---|
| Inventive example 3A | 15 | 2 | 200 | 10.0 |
| Inventive example 3B | 15 | 0.7 | 200 | 3.5 |
| Inventive example 3C | 15 | 7 | 200 | 35.0 |
| Inventive example 3D | 3 | 0.7 | 200 | 3.5 |
| Inventive example 3E | 3 | 7 | 200 | 35.0 |
| Comparative example 3a | 15 | 0.1 | 200 | 0.5 |
| Comparative example 3b | 15 | 20 | 200 | 100 |
| Reference example 3a | 3 | 0.1 | 200 | 0.5 |
| Comparative example 3c | 3 | 20 | 200 | 100 |

TABLE 5

| | Before the shock was applied (megohm) | After the first shock was applied (megohm) | After the second shock was applied (megohm) | After the third shock was applied (megohm) |
|---|---|---|---|---|
| Inventive example 3A | 120 | 1.3 | 0.298 | 0.121 |
| Inventive example 3B | 120 | 0.756 | 0.121 | 0.121 |
| Inventive example 3C | 120 | 48 | 6 | 6 |

TABLE 5-continued

|  | Before the shock was applied (megohm) | After the first shock was applied (megohm) | After the second shock was applied (megohm) | After the third shock was applied (megohm) |
|---|---|---|---|---|
| Inventive example 3D | 120 | 75 | 41 | 41 |
| Inventive example 3E | 120 | 112 | 108 | 108 |
| Comparative example 3a | 120 | 121 | 121 | Not measured |
| Comparative example 3b | 120 | 120 | Not measured | Not measured |
| Reference example 3a | 120 | 70 | 35 | 35 |
| Comparative example 3c | 120 | 120 | Not measured | Not measured |

As is clear from Table 4 and Table 5, the resistance value of the semiconductor layer 57 is significantly lowered with an increase in the number of shocks. Therefore, it is possible to determine how many shocks were applied to the shock recording device 1 based on the resistance value of the semiconductor layer 57.

INDUSTRIAL APPLICABILITY

The shock recording device 1 according to the present invention can be incorporated in an electronic device such as a mobile phone, a smartphone, or a tablet. When the electronic device is out of order, it is determined whether or not a shock was applied to the electronic device by measuring the resistance value of the semiconductor layer included in the shock recording device 1. Specifically, a user of the electronic device hands over the electric device to a determiner. Then, the determiner measures a value of the semiconductor layer through the drain electrode and the source electrode. Finally, the determiner determines whether or not a shock has been applied to the shock recording device included in the electronic device.

REFERENCE SIGNS LIST

1 Shock recording device
3 Vibration energy harvester
3a First electrode
3b Second electrode
5 Ferroelectric transistor
G Gate electrode
S Source electrode
D Drain electrode
7 First terminal
9 Second terminal
13 Zener diode
15 Node
17 Node
19 Reset voltage generation circuit
23 Resistance
25 DC power source
27 Switch
51 Substrate
53 Electrode layer
53a First region
53b Second region
53c Narrowed part
55 Ferroelectric layer
57 Semiconductor layer
57a First semiconductor region
57b Second semiconductor region
59 Contact plug

The invention claimed is:

1. A shock recording device, comprising:
a vibration energy harvester comprising a first electrode and a second electrode, the vibration energy harvester converting an energy of a shock applied thereto into a potential difference between the first electrode and the second electrode; and
a ferroelectric transistor comprising a gate electrode, a source electrode, and a drain electrode, the ferroelectric transistor further comprising a stacked structure of a ferroelectric layer and a semiconductor layer,
wherein
the gate electrode is electrically connected to the first electrode;
the source electrode is electrically connected to the second electrode; and
the shock recording device comprises a zener diode electrically connected to the source electrode and the drain electrode.

2. The shock recording device according to claim 1, wherein
the zener diode comprises an anode terminal and a cathode terminal;
the anode terminal is electrically connected to the source electrode; and
the cathode terminal is electrically connected to the gate electrode.

3. The shock recording device according to claim 1, wherein
the zener diode comprises an anode terminal and a cathode terminal;
the cathode terminal is electrically connected to the source electrode; and
the anode terminal is electrically connected to the gate electrode.

4. The shock recording device according to claim 1, further comprising:
a reset voltage generation circuit comprising a DC power source and a switch element, both of which are electrically connected in series, wherein
one end of the DC power source is electrically connected to the drain electrode; and
one end of the switch element is electrically connected to the gate electrode.

5. The shock recording device according to claim 1, further comprising:
a resistance, wherein
one end of the resistance is electrically connected to the gate electrode; and
the other end of the resistance is electrically connected to the zener diode and the vibration energy harvester.

6. The shock recording device according to claim 5, wherein
the ferroelectric transistor has a gate capacitance $C_G$;
the resistance has a resistance value R; and
the following mathematical formula (I) is satisfied:

$$0.7 \text{ milliseconds} \leq \text{time constant } \tau \text{ (second)} \leq 7.0 \text{ milliseconds} \quad (I)$$

where
the time constant $\tau$ (second) is equal to the product of (the resistance value R)·(the gate capacitance $C_G$).

* * * * *